(12) United States Patent
Hubbard et al.

(10) Patent No.: US 10,000,366 B2
(45) Date of Patent: Jun. 19, 2018

(54) BRAKE TORQUE CONTROL

(75) Inventors: James L. Hubbard, Kensington, CT (US); Daryl J. Marvin, Farmington, CT (US); Stephen R. Nichols, Unionville, CT (US); Harold Terry, Avon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1436 days.

(21) Appl. No.: 13/201,673

(22) PCT Filed: Mar. 10, 2009

(86) PCT No.: PCT/US2009/036622
§ 371 (c)(1),
(2), (4) Date: Aug. 16, 2011

(87) PCT Pub. No.: WO2010/104502
PCT Pub. Date: Sep. 16, 2010

(65) Prior Publication Data
US 2011/0303493 A1    Dec. 15, 2011

(51) Int. Cl.
*B66B 5/14*    (2006.01)
*F16D 66/00*    (2006.01)
*B66D 5/30*    (2006.01)
*B66D 5/14*    (2006.01)
*B66B 1/30*    (2006.01)

(52) U.S. Cl.
CPC ............... *B66D 5/30* (2013.01); *B66B 1/304* (2013.01); *B66D 5/14* (2013.01); *F16D 66/00* (2013.01); *F16D 2066/005* (2013.01)

(58) Field of Classification Search
CPC .......... B66B 5/0025; B66B 5/02; B66B 5/30; B66B 11/08

USPC ....... 187/254, 288, 359, 356, 370, 375, 391, 187/393; 188/71.7
IPC ...................................................... B66B 11/08
See application file for complete search history.

(56) References Cited

U.S. PATENT DOCUMENTS

| | | |
|---|---|---|
| 4,738,337 A | 4/1988 | Caputo |
| 4,754,850 A | 7/1988 | Caputo |
| 4,995,478 A | 2/1991 | Oshima et al. |
| 5,025,896 A | 6/1991 | Arabori et al. |

(Continued)

FOREIGN PATENT DOCUMENTS

| | | |
|---|---|---|
| JP | 6256277 | 3/1987 |
| JP | 01-242375 | 9/1989 |

(Continued)

OTHER PUBLICATIONS

Search Report—State Intellectual Property Office of People's Republic of China for Application No. 200980158038.9 dated Dec. 19, 2012.
Search Report—State Intellectual Property Office of People's Republic of China for Application No. 200980158038.9 dated Aug. 13, 2013.

(Continued)

*Primary Examiner* — Michael R Mansen
(74) *Attorney, Agent, or Firm* — Carlson, Gaskey & Olds

(57) ABSTRACT

An exemplary brake device includes a brake element configured to apply a braking force to resist rotation of an associated component. A mounting member is configured to mount the brake device to a stationary surface. The mounting member is at least partially moveable relative to the stationary surface responsive to a torque on the brake device. A sensor provides an indication of a force associated with any movement of the mounting member relative to the stationary surface responsive to the torque.

22 Claims, 3 Drawing Sheets

(56) References Cited

U.S. PATENT DOCUMENTS

| | | | |
|---|---|---|---|
| 5,067,593 A | 11/1991 | Tanaka et al. | |
| 5,477,942 A * | 12/1995 | Shea et al. | 187/395 |
| 6,318,505 B1 | 11/2001 | De Angelis | |
| 6,401,873 B1 | 6/2002 | Mustalahti et al. | |
| 6,488,128 B1 | 12/2002 | Slabinski | |
| 6,601,828 B2 * | 8/2003 | Strbuncelj et al. | 254/266 |
| 8,104,586 B2 | 1/2012 | Traktovenko et al. | |
| 2005/0127749 A1 * | 6/2005 | Hartmann et al. | 303/122 |
| 2006/0175142 A1 * | 8/2006 | Flynn | B66B 7/044 187/284 |
| 2006/0175153 A1 * | 8/2006 | Hubbard et al. | 188/1.11 E |
| 2006/0180406 A1 * | 8/2006 | Gremaud et al. | 187/355 |
| 2009/0120728 A1 | 5/2009 | Traktovenko et al. | |
| 2010/0300815 A1 | 12/2010 | Stolt et al. | |
| 2014/0311257 A1 * | 10/2014 | Hubbard | B66B 5/0037 73/862.12 |

FOREIGN PATENT DOCUMENTS

| | | |
|---|---|---|
| JP | 9030743 A | 2/1997 |
| JP | H0930743 A | 2/1997 |
| WO | 2006093487 A1 | 9/2006 |

OTHER PUBLICATIONS

International Preliminary Report on Patentability for International application No. PCT/US2009/036622 dated Sep. 22, 2011.
International Search Report and Written Opinion of the International Searching Authority for International application No. PCT/US2009/036622 dated Dec. 22, 2009.

* cited by examiner

BRAKE TORQUE CONTROL

BACKGROUND

Elevator systems are in widespread use. Elevator systems are useful for carrying passengers, for example, between various levels within a building. Typical elevator systems include a machine comprising a motor and a brake for controlling the movement and position of the elevator car to provide the desired elevator service.

When an elevator car is stopped at a landing, the brake is utilized for holding the elevator car in the desired position. Various control techniques are known for releasing or lifting the brake.

For example, it is known to pre-torque the motor of the machine prior to lifting the brake to avoid any bouncing or jostling of the elevator car at the beginning of an elevator run. The load on the elevator car changes as passengers enter or exit the car, for example. Therefore, the possibility exists that the load on an elevator car is out of balance with the counterweight when the elevator car is about to depart from that landing. Any imbalance may cause the car to move vertically independent of movement of the motor when the brake is released. This may be experienced by passengers as a slight bump or jostle within the elevator car.

There are known techniques for pre-torquing the elevator machine motor to address such situations and avoid any undesirable car movement at the beginning of a run. One such technique is shown in U.S. Pat. No. 4,995,478. Such techniques typically rely upon measuring or detecting passenger load on the elevator car. There are known drawbacks associated with those techniques. Another technique is shown in U.S. Pat. No. 6,318,505. The technique in that document focuses on a brake that is applied directly to a guiderail, which is not the same as a machine brake.

Those skilled in the art are always striving to make improvements. It would be useful to have the ability to control the amount of torque on an elevator machine brake without depending upon a measurement of the load in the associated elevator car.

SUMMARY

An exemplary brake device includes a brake element configured to apply a braking force to resist rotation of an associated component. A mounting member is configured to mount the brake device to a stationary surface. The mounting member is at least partially moveable relative to the stationary surface responsive to a torque on the brake device. A sensor provides an indication of a force associated with any movement of the mounting member relative to the stationary surface responsive to the torque.

An exemplary elevator machine includes a frame. A motor is supported at least partially by the frame. A traction sheave is selectively moveable by the motor. A brake element selectively resists rotation of the traction sheave. A mounting member is mounted to the frame such that the mounting member is partially moveable relative to the frame responsive to torque on the brake element resulting from the brake element resisting rotation of the traction sheave. A sensor provides an indication of a force associated with movement of the mounting member relative to the frame.

An exemplary method of monitoring a brake includes detecting a force that causes a brake mounting member to move relative to an associated stationary surface. A determination is made whether the detected force is within a range corresponding to an acceptable amount of torque on the brake. An indication is provided at least when the force is outside of the range.

The various features and advantages of this invention will become apparent to those skilled in the art from the following detailed description. The drawings that accompany the detailed description can be briefly described as follows.

DETAILED DESCRIPTION

One example use of the brake torque monitoring and controlling functions of the disclosed examples is within an elevator system. The following description uses an elevator system for discussion purposes. The disclosed torque control and monitoring is not necessarily limited to that context.

Figure 1:
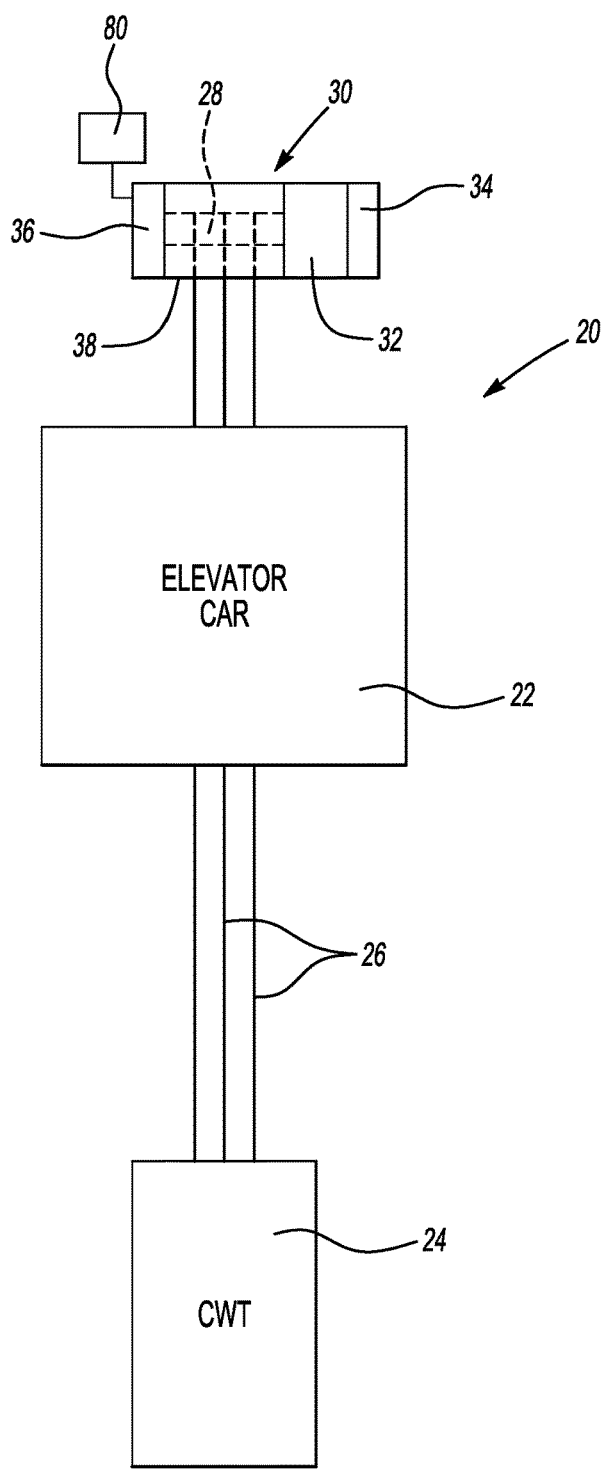
FIG. 1 schematically shows selected portions of an elevator system including a brake device designed according to an embodiment of this invention.

FIG. 1 schematically shows selected portions of an exemplary elevator system 20. An elevator car 22 is associated with a counterweight 24. A roping arrangement 26 suspends the elevator car 22 and counterweight 24 and moves responsive to movement of a traction sheave 28 to cause desired movement of the elevator car 22.

A machine 30 is provided for controlling movement of the traction sheave 28. The machine 30 includes a motor 32 that selectively causes the traction sheave 28 to rotate. A control 34 controls operation of the motor 32. A brake device 36 selectively resists rotation of the traction sheave 28. The brake device 36 is useful for stopping the elevator car 22 at a desired landing and maintaining the elevator car in a desired vertical position, for example. In the illustrated example, the brake device 36 and the motor 32 are supported by a common machine frame 38.

Figure 2:
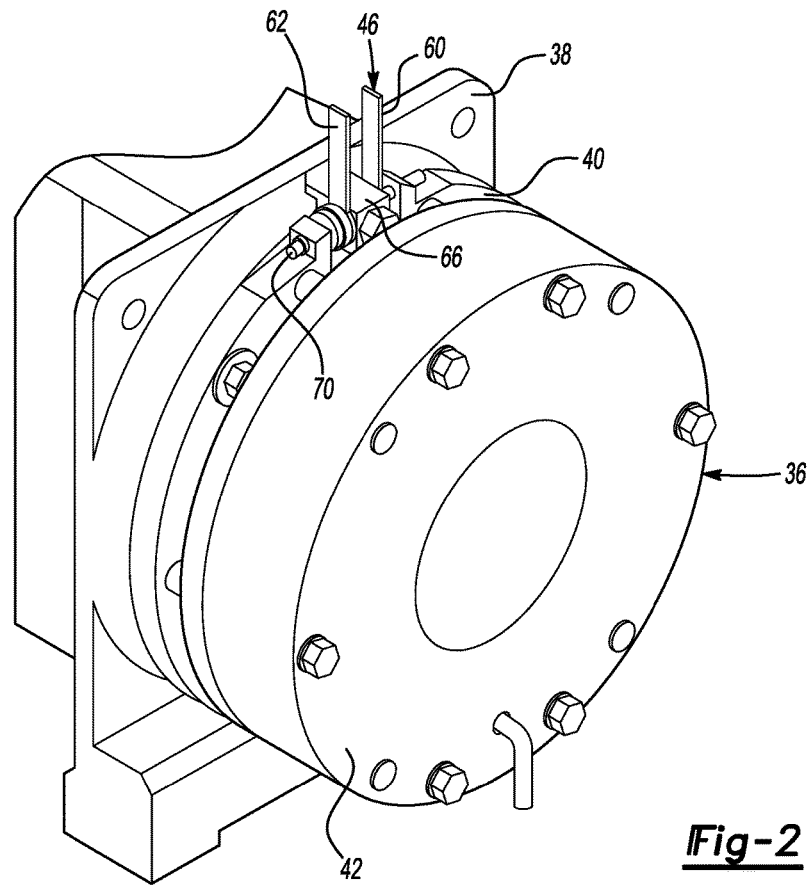
FIG. 2 is a perspective illustration of an example brake device.
Figure 3:
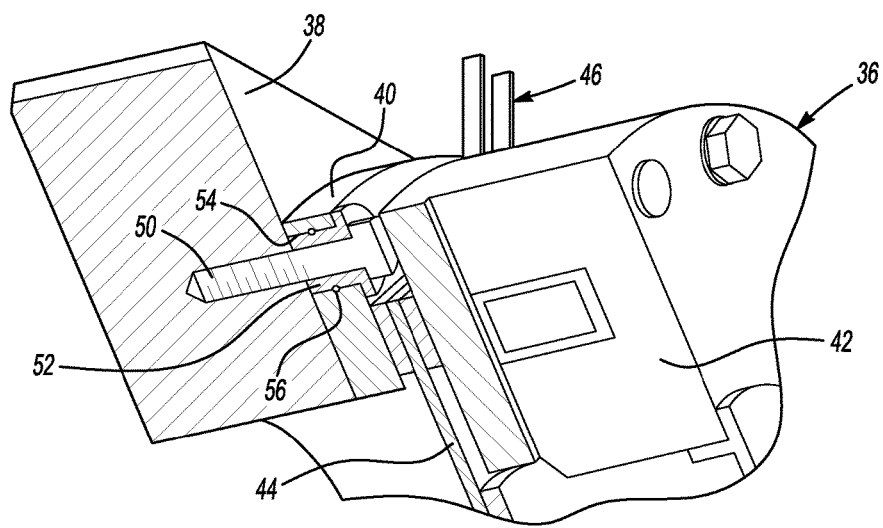
FIG. 3 is a perspective, cutaway illustration showing selected portions of the example of FIG. 2.
Figure 4:
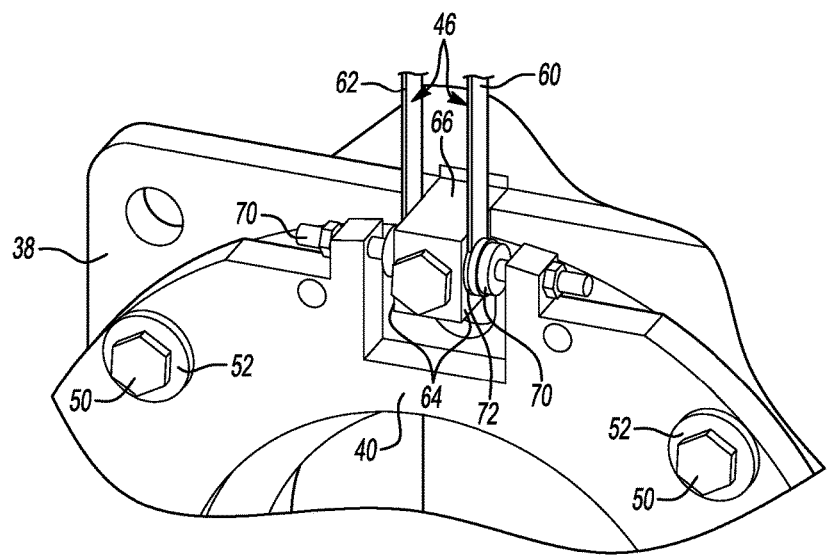
FIG. 4 is a perspective view of selected portions of the example of FIG. 2.

FIGS. 2-4 illustrate an example brake device 36. A mounting member 40 facilitates mounting the brake device 36 to a stationary surface, which in this example comprises a surface on the machine frame 38. A brake actuator 42 causes a brake member 44 to selectively resist rotation of the traction sheave 28. The manner in which the brake device 36 interacts with the traction sheave 28 may be a known manner and is therefore not shown in detail. A sensor 46 detects a force associated with torque on the brake device 36. In this example, the sensor 46 provides an indication of a force associated with any movement of the mounting member 40 relative to the stationary surface of the machine frame 38 responsive to torque on the brake device 36.

As best appreciated from FIG. 3, the example mounting member 40 is at least partially resiliently mounted relative to the machine frame 38 such that the mounting member 40 is partially moveable relative to the machine frame 38. Movement of the mounting member 40 is within a very limited range to allow for force monitoring while still providing a stable arrangement for carrying the loads associated with the brake device 36 resisting rotation of the traction sheave 28.

As best appreciated from FIG. 3, this example includes a resilient mounting arrangement in which an anchor 50, such as a bolt, and a bushing 52 are rigidly secured in a fixed position relative to the machine frame 38. The bushing 52 is received within an opening 54 in the mounting member 40. A resilient member 56 associated with the bushing 54 deflects or at least partially compresses responsive to torque on the mounting member 40 resulting from torque on the brake device 36 associated with the brake member 44 resisting rotation of the traction sheave 28. In one example, the resilient member 56 comprises an O-ring. Allowing for some deflection or slight movement of the mounting member 40 relative to the machine frame 38 allows for the sensor 46 to provide an indication of forces associated with torque on the brake device 36.

As best appreciated from FIG. 4, the illustrated example sensor 46 includes a first sensing element 60 that is configured to provide an indication of a force in a first direction associated with any relative movement between the mounting member 40 and the machine frame 38. A second sensing element 62 provides an indication of a force in a second, opposite direction to that of the first force. According to the perspective of the drawing, in this example the first sensing element 60 provides an indication of a force in a counter-clockwise direction while the second sensing element 62 provides an indication of a force in a clockwise direction.

In one example, the sensing elements comprise force sensing resistors. In another example, the sensing elements comprise piezo-resistive sensors. Other example sensors useful as the first sensing element 60 and the second sensing element 62 includes strain gauge sensors, capacitive sensors, inductive sensors, potentiometric sensors, pressure switches and precision micro-switches. The amount of deflection or relative movement between the mounting member 40 and the machine frame 38 will be very small and the first sensing element 60 and second sensing element 62 are selected to be able to detect forces associated with very slight changes in the orientation of the mounting member 40 relative to the machine frame 38.

In the illustrated example, the sensing elements 60 and 62 are received against corresponding reaction surfaces 64 on a sensing block 66 that remains stationary relative to the machine frame 38. In this example, the machine frame 38 supports the sensing block 66. In another example, the sensing block 66 comprises a portion of the machine frame 38. Setting members 70 secure the sensing elements 60 and 62 in a manner that they become compressed responsive to a corresponding movement of the mounting member 40 relative to the machine frame 38. The illustrated example includes elastomeric cushion members 72 associated with the sensing elements to evenly distribute the load from the setting members 70 across the appropriate portions of the sensing elements.

The indications from the sensing elements 60 and 62 are interpreted by a torque module 80 (shown in FIG. 1) that provides an indication regarding forces detected by the sensor 46 to the control 34.

Figure 5:
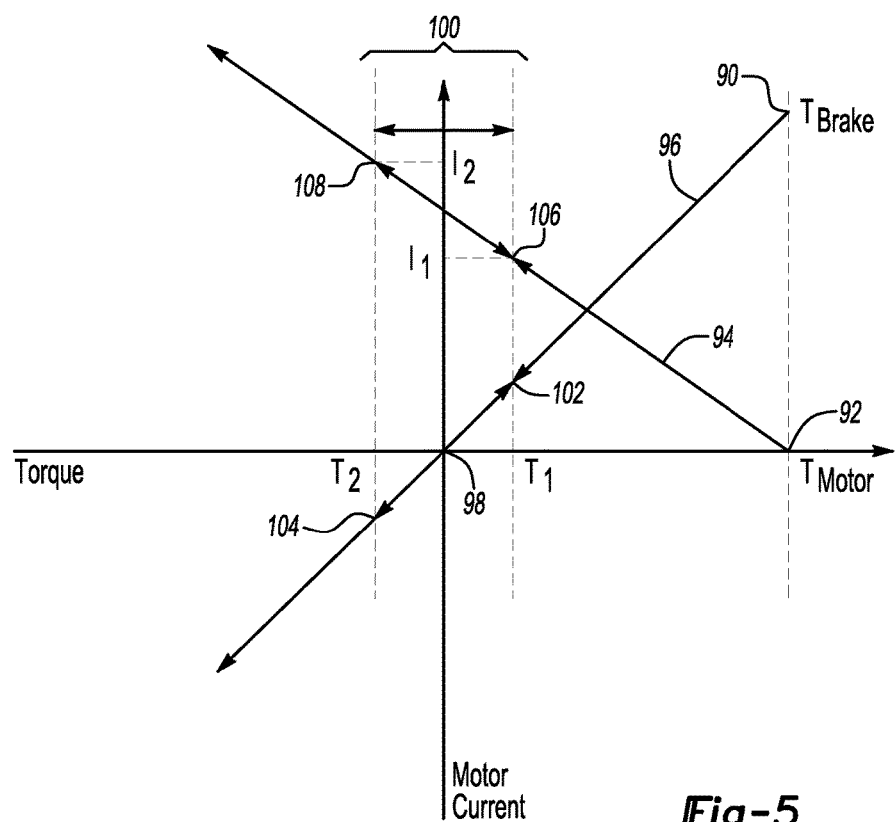
FIG. 5 graphically illustrates an example control strategy.

One example control strategy involving the example brake device 36 can be appreciated from FIG. 5. The elevator car 22 is parked at a landing. There is an imbalance in the load between the counterweight 24 and the elevator car 22. As a result, there is a torque on the brake device 36 as shown at 90. The motor 32 is de-energized and, therefore, the torque of the motor 32 has a zero value as shown at 92. Under these conditions, the first sensing element 60 provides an indication of a force corresponding to the torque level illustrated at 90.

Before the elevator car leaves that landing, it is desirable to alleviate torque on the brake to provide a smooth transition from a stationary position as the elevator car begins to accelerate. The control 34 provides current to the motor 32 to increase the motor torque as schematically shown along the curve 94. The motor 32 is energized to provide a force that counteracts the torque indicated by the sensing element 60. In other words, the motor 32 attempts to rotate the traction sheave 28 in a direction to alleviate the force detected by the first sensing element 60 (e.g., in a direction opposite to that of the indicated force). As a result, the torque indicated by the force detected by the first sensing element 60 decreases as schematically shown by the curve 96. The torque on the brake device 36 is completely alleviated when the brake torque reaches a zero value as shown at 98. The sensor 46 provides an indication of this to the torque module 80 in one example. The control 34 receives a corresponding output from the torque module 80.

One example includes controlling the motor 32 to achieve a zero torque value as shown at 98. The example of FIG. 5 allows for some tolerance band about the zero torque value at 98. This example includes determining when a force indicated by the sensor 46 is within an acceptable range, which is schematically shown at 100 in FIG. 5.

In one example, the torque module 80 determines when the force indicated by the first sensing element 60 transitions from being outside of the acceptable range 100 to being within that range. This transition point is shown at 102. In one example, as soon as the torque module 80 provides an output that the torque on the brake device 36 is within the acceptable range 100, the motor 32 maintains a corresponding amount of torque on the traction sheave 28.

One example includes continuing to increase the motor torque until the second sensing element 62 indicates that a force detected by that sensing element has exceeded a corresponding threshold of the range 100. This is shown at 104 in FIG. 5. The motor torque may be continuously adjusted back and forth to detect the points at which the forces indicated by the sensor 46 transition between being inside and out of the acceptable range 100.

Each of the transition points 102 and 104 have an associated motor current shown at 106 and 108, respectively. In one example, the control 34 in cooperation with the torque module 80 determines the current values at the transition points 106 and 108. Those two current values are then averaged to determine a pre-torque current to be supplied to the motor 32 prior to releasing or lifting the brake of the brake device 36. Utilizing an average of the current values at the transition points 106 and 108 facilitates easier determinations compared to always attempting to exactly find the zero torque point at 98. Using averaging in this manner accounts for potential hysteresis of the system and possible wear of the components of the sensor 46, for example.

Another example monitoring function provided by the example sensor 46 is to detect a dragging brake condition. Typical elevator systems include dedicated brake switches that are intended to indicate when a brake is disengaged at the beginning of an elevator run. The brake switches are supposed to indicate whether the brake remains disengaged for the entire run. One shortcoming of such brake switches that they are only capable of measuring the movement of the brake actuator and do not provide any indication of actual brake torque. Even with such switches in place, it is possible for brake drag to occur undetected.

With the example sensor 46, brake drag can be directly measured. The sensor 46 will provide an output indicating torque on the brake during elevator car movement if the brake element 44 is dragging, for example. In one example, when any brake drag indication is within a selected range, the torque module 80 provides a corresponding output so that maintenance personnel can address the situation accordingly. If the indicated torque associated with brake drag exceeds a selected amount, the torque module 80 provides a warning output to the control 34. In one example, the control 34 interprets such a warning as a need to interrupt normal elevator system operation and causes the elevator car 22 to proceed to an appropriate landing where the car doors are opened to allow any passengers to exit the elevator car. The elevator car is then taken out of service until appropriate maintenance personnel verify the operating condition of the brake device 36.

One feature of the disclosed examples is that there is no requirement for an accurate torque measurement at the brake. Instead, it is only necessary to measure a force associated with a limited amount of movement of the mounting member 40 relative to the frame 38. The sensor 46 does not absorb or detect load on the elevator car but, instead, detects forces associated with the relative movement of the mounting member 40 and the frame 38. Another feature of the disclosed examples is that there is no requirement for measuring the load on the elevator car for purposes of attempting to calculate a pre-torque value for the motor 32. With the disclosed examples, it is possible to use motor torque to unload the brake prior to lifting the brake at the beginning of an elevator run in a more convenient and reliable manner compared to previous techniques. Additionally, conventional brake switches can be eliminated and the disclosed brake drag monitoring may be used.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A brake device, comprising:
a brake element configured to apply a braking force to resist rotation of an associated component;
a mounting member configured to mount the brake device to a stationary surface, the mounting member being at least partially moveable relative to the stationary surface in a first direction responsive to a torque on the brake device during an application of the braking force; and
a sensor that provides an indication of a force associated with any movement of the mounting member relative to the stationary surface in the first direction responsive to the torque, the sensor does not absorb a load on the brake element as the braking force is applied.

2. The device of claim 1, wherein the sensor comprises
a first sensing element that provides an indication of a force associated with movement of the mounting member relative to the stationary surface in the first direction and
a second sensing element that provides an indication of a force associated with movement of the mounting member relative to the stationary surface in a second, opposite direction.

3. The device of claim 2, comprising
a torque module that determines when the force indicated by either of the sensing elements exceeds a selected threshold.

4. The device of claim 3, wherein the torque module determines when a torque on the brake device is in an acceptable range based on the indications from the first and second sensing elements and provides an output indicating when the torque on the brake device is outside of the acceptable range.

5. The device of claim 1, wherein the mounting member comprises an at least partially resilient bushing configured to be situated where the mounting member is secured to the stationary surface, the at least partially resilient bushing at least partially deflecting responsive to the torque on the brake element.

6. The device of claim 5, wherein the bushing comprises a resilient o-ring.

7. The device of claim 1, wherein the sensor comprises at least one of a force resistive sensor or a piezo-resistive sensor.

8. An elevator machine, comprising:
a frame;
a motor supported at least partially by the frame;
a traction sheave that is selectively moveable by the motor;
a brake element that selectively resists rotation of the traction sheave;
a mounting member mounted to the frame such that the mounting member is partially moveable relative to the frame responsive to torque on the brake element resulting from the brake element resisting rotation of the traction sheave;
at least one securing member that secures the mounting member to the frame; and
a sensor that provides an indication of a force associated with movement of the mounting member relative to the frame, wherein the sensor is distinct from the securing member and the sensor does not absorb load on the traction sheave or the brake element as the brake element resists rotation of the traction sheave.

9. The elevator machine of claim 8, comprising
a torque module that determines whether a torque on the brake element is within a selected range based on the indication from the sensor.

10. The elevator machine of claim 9, wherein
the sensor comprises a first sensing element that provides an indication of a force associated with movement of the mounting member relative to the frame in a first direction and a second sensing element that provides an indication of a force associated with movement of the mounting member relative to the frame in a second, opposite direction; and
the torque module determines when the force indicated by either of the sensing elements exceeds a selected threshold.

11. The elevator machine of claim 10, wherein the torque module determines when a torque on the brake element is in an acceptable range based on the indications from the first and second sensing elements and provides an output indicating when the torque on the brake element is outside of the acceptable range.

12. The elevator machine of claim 10, wherein the frame comprises a reaction surface against which the sensing elements are biased responsive to the torque on the mounting member.

13. The elevator machine of claim 9, comprising a motor control that adjusts a torque provided by the motor responsive to the output of the torque module for relieving a corresponding torque on the brake element.

14. The elevator machine of claim 9, wherein the torque module output comprises an indication of a dragging brake during desired movement of the traction sheave.

15. The elevator machine of claim 8, wherein the mounting member comprises an at least partially resilient bushing configured to be situated where the mounting member is secured to the frame, the at least partially resilient bushing at least partially deflecting responsive to the torque on the brake element.

16. The elevator machine of claim 15, wherein the bushing comprises a resilient o-ring.

17. The elevator machine of claim 8, wherein the sensor comprises at least one of a force resistive sensor or a piezo-resistive sensor.

18. A method of monitoring a brake, comprising the steps of:
using at least one sensor for detecting a force that causes a brake mounting member to move relative to an associated stationary surface without using the sensor for absorbing a load associated with the force;
determining if the detected force is within a range corresponding to an acceptable amount of torque on the brake; and
providing an indication of at least whether the force is outside of the range.

19. The method of claim 18, comprising
detecting the force in a first direction when an associated elevator car is stopped;
providing a counteracting force in a second, opposite direction until the force in the first direction is within the range; and
releasing the brake while the detected force is in the range.

20. The method of claim 19, comprising
determining an operative condition of an associated motor when the force is in the range; and
placing the motor into the operative condition prior to releasing the brake.

21. The method of claim 19, comprising
determining a first motor current corresponding to the counteracting force that results in the force in the first direction transitioning into the range;
providing further counteracting force in the second direction until an amount of force in the second direction is outside of the range;
determining a second motor current corresponding to the force in the second direction transitioning outside of the range;
determining an average current of the first motor current and the second motor current; and
providing the average current to a motor associated with the machine brake at a time of releasing the brake.

22. The method of claim 18, comprising
providing an indication of a dragging brake responsive to detecting the force when an elevator car associated with the brake is moving and the brake is supposed to be disengaged.

* * * * *